US006263454B1

(12) United States Patent
Gold et al.

(10) Patent No.: US 6,263,454 B1
(45) Date of Patent: Jul. 17, 2001

(54) STORAGE SYSTEM

(75) Inventors: Stephen Gold; Jonathan Conrad Lord; Philip John Turner, all of Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/888,716

(22) Filed: Jul. 7, 1997

(30) Foreign Application Priority Data

Jul. 23, 1996 (EP) .................................................. 96305388

(51) Int. Cl.[7] ...................................................... G06F 11/30
(52) U.S. Cl. .................................. 714/25; 714/30; 714/46
(58) Field of Search ................................ 395/800, 182.06, 395/182.04, 182.02; 235/153; 360/191; 371/13, 24; 364/900; 714/25, 30, 46

(56) References Cited

U.S. PATENT DOCUMENTS

| | | | | |
|---|---|---|---|---|
| 4,048,481 | * | 9/1977 | Bailey, Jr. et al. | 235/153 |
| 4,053,752 | * | 10/1977 | DeJohn et al. | 714/710 |
| 4,549,295 | | 10/1985 | Purvis | 371/13 |
| 4,689,767 | * | 8/1987 | Stevenson et al. | 364/900 |
| 5,200,960 | * | 4/1993 | Hamilton | 371/24 |
| 5,450,609 | | 9/1995 | Schultz et al. | 395/800 |
| 5,455,926 | * | 10/1995 | Keele et al. | 711/4 |
| 5,463,763 | * | 10/1995 | Kubo | 395/182.02 |
| 5,463,765 | * | 10/1995 | Kakuta et al. | 395/182.04 |
| 5,500,940 | * | 3/1996 | Skeie | 714/25 |
| 5,757,594 | * | 5/1998 | Dang et al. | 360/191 |
| 5,764,881 | * | 6/1998 | Yoshida | 395/182.06 |
| 5,844,919 | * | 12/1998 | Glover et al. | 714/769 |

OTHER PUBLICATIONS

IBM TDB, vol. 37, No. 02B, Feb. 1994, p 241, "Keeping Users Aware of the Status of an Object Affected by Multiple Program".

IBM TDB, vol. 37, No. 06B, Jun. 1994, pp 499–501, Operating Intervention Message Management for Tape Drive Displays.

European Search Report; EP 96305388.

\* cited by examiner

*Primary Examiner*—Thomas Lee
*Assistant Examiner*—Nguyen Xuan Nguyen

(57) ABSTRACT

The present invention relates to storage systems for computer data and relates particularly to diagnosis of errors and status monitoring of such a system. The invention provides a system for storing computer data in which different error messages are generated according to how many times a specified low-level error has occurred. In the particular embodiment, different combinations of error messages are generated according to how many times a particular low-level error has occurred.

16 Claims, 2 Drawing Sheets

STORAGE SYSTEM

TECHNICAL FIELD

The present invention relates to devices for storing computer data and relates particularly to diagnostics and status monitoring.

BACKGROUND ART

It is known to provide status monitoring in a disc drive and U.S. Pat. No. 5,450,609 describes one such system in which an array of disc drives includes a facility for status monitoring and for warning the user of a problem. The warning facility described is not very different in scope from the known facility on existing tape drives of a warning light indicating failure of a backup operation.

DISCLOSURE OF INVENTION

The present invention aims to provide a status monitoring and diagnostic facility for a storage device which takes account of the fact that the storage medium is removable and which diagnoses a wider set of error conditions than simply flagging imminent failure and which also takes account of the number of occurrences of a particular type of error.

According to the present invention we provide a system for storing computer data comprising:

a storage device having means for reading data from and writing data to removable media;

and a controller, wherein the storage device comprises:

means to perform error diagnosis and to translate low-level error indicators into a plurality of high level error conditions;

means to communicate occurrence of these high level error conditions to the controller to trigger the provision of error messages to the user;

means for communicating different high level error conditions according to how many times a specified low-level error has occurred.

Thus, in systems implementing the present invention, the particular high level error conditions communicated depend on how many times a relevant low-level error has occurred. This feature enables the provision of a succession of different error messages to the user recommending different actions if an error persists.

The term 'low-level error indicator' is intended to cover both error codes and other relevant triggers generated in the storage device. Low-level error codes cover items such as unrecoverable read and/or write errors but there are also other relevant triggers for high level error conditions such as the rate at which data is being written, data relevant to the media being used etc. Low-level error indicators are normally generated by the firmware in the storage device.

The system may be configured so that only one high level error condition is communicated as a result of the occurrence of a low-level error indicator. However, very often more than one high level error condition may be triggered by the occurrence of a low-level error so that the user may receive a corresponding combination of error messages. In the embodiments to be described, the system comprises means for communicating different combinations of high level error conditions according to how many times a particular low-level error has occurred.

Preferably, the low-level error indicators are grouped into functional types and a predetermined sequence of high level error conditions is communicated according to how many times a low-level error of the same functional type has occurred.

Thus, in the embodiments to be described, the low-level errors are grouped into broad categories. If successive errors within one of these groups occur, this triggers different combinations of the high level error conditions.

In the embodiments to be described, the system comprises means for communicating different high level error conditions according to the elapsed time since the storage device was last cleaned. Many error conditions can be alleviated by running a cleaning cycle and so, in practice, this is often the first suggested error recovery step.

Preferably, the error messages are categorised according to severity. In the embodiments to be described there are three categories of severity: Information, Warning and Critical.

The system may comprise means automatically to initiate a predetermined sequence of error recovery steps according to the high level error conditions identified. This feature means that some error recovery or error prevention steps may automatically be initiated by the controller rather than the user. One possibility in the case of an autoloader (a system with a mechanism for automatically loading media into a storage device), would be an automatic cleaning cycle using specialised cleaning media.

Preferably, error status information is stored in the storage device in a standardised format. This feature enables backup software applications to interface with storage devices from different manufacturers which implement the present invention. In this way, the invention provides a technique whereby the way in which errors are detected and categorised for a particular storage device is device-specific and can be decided by the device manufacturer but within the context of a standardised scheme which enables all devices complying with the standardised format to interface with backup application software from different software providers in order to provide the user with consistent error indications.

There are different ways in which the controller may receive error information from the storage device. In one embodiment to be described, the system is configured so that the occurrence of high level error conditions is communicated to the controller at predetermined points in a storage operation. In another embodiment to be described, the system is configured so that the occurrence of high level error conditions is communicated to the controller whenever a new error is indicated by the storage device.

In the embodiments to be described, the storage device is a tape drive, but the invention applies also to other storage devices with removable media eg. optical disc drives.

The controller may be backup controller software running on a host computer. Alternatively the system may be part of network in which the controller is backup software running on a backup server on the network. However, the invention is not limited to these alternatives and the controller may be implemented in software and/or hardware and may be in a general purpose computer or a dedicated device, whether standalone or connected to a network. The system may comprise a plurality of storage devices such as in an autoloader or a coordinated array of storage devices.

Other aspects and features of the present invention will become apparent from the following description, claims and drawings.

BRIEF DESCRIPTION OF DRAWINGS

Particular embodiments of the present invention will now be described, by way of example, with reference to.

The invention will also be described, by way of example, with reference to tables reproduced at the end of this description in which:

Table 1 shows the error conditions relating to particular flags;

Table 2 shows the sequences of error conditions for read-after-write errors;

Table 3 shows the sequences of error conditions for read errors;

Table 4 shows the sequences of error conditions for hard errors;

Table 6 shows the format of the Log Sense page;

Table 6 shows the format of the Mode Sense page.

BEST MODE FOR CARRYING OUT THE INVENTION, & INDUSTRIAL APPLICABILITY

Figure 1:
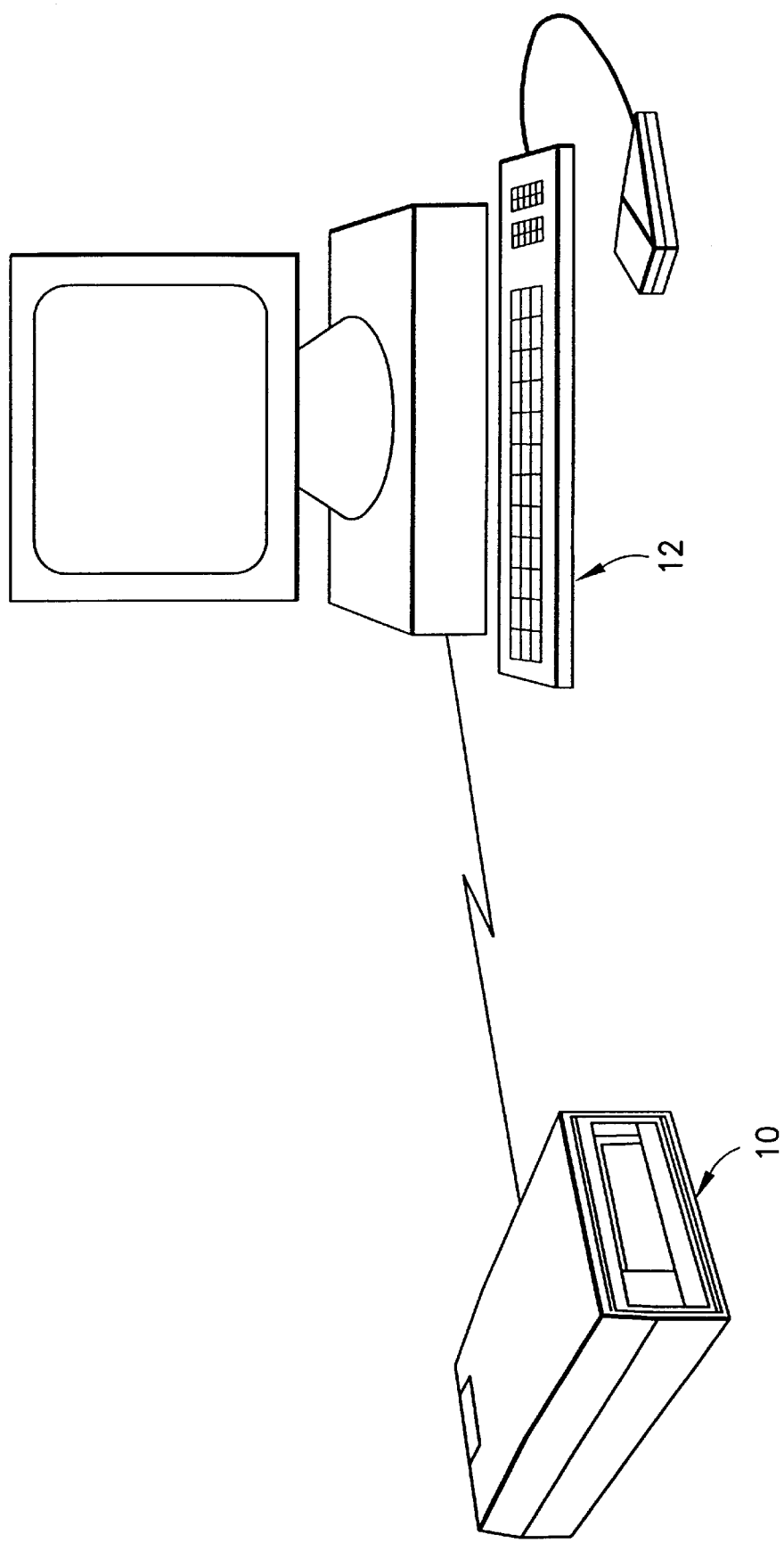
FIG. 1 which shows a tape drive connected to a host computer.

Referring to FIG. 1, a tape drive 10 is directly connected to a host computer 12. The tape drive 10 receives data to be backed up from the host computer 12 and sends saved data back to the host when requested. A standard SCSI ('Small Computer System Interface') interface is used to interconnect the tape drive 10 with the host computer 12.

Figure 2:
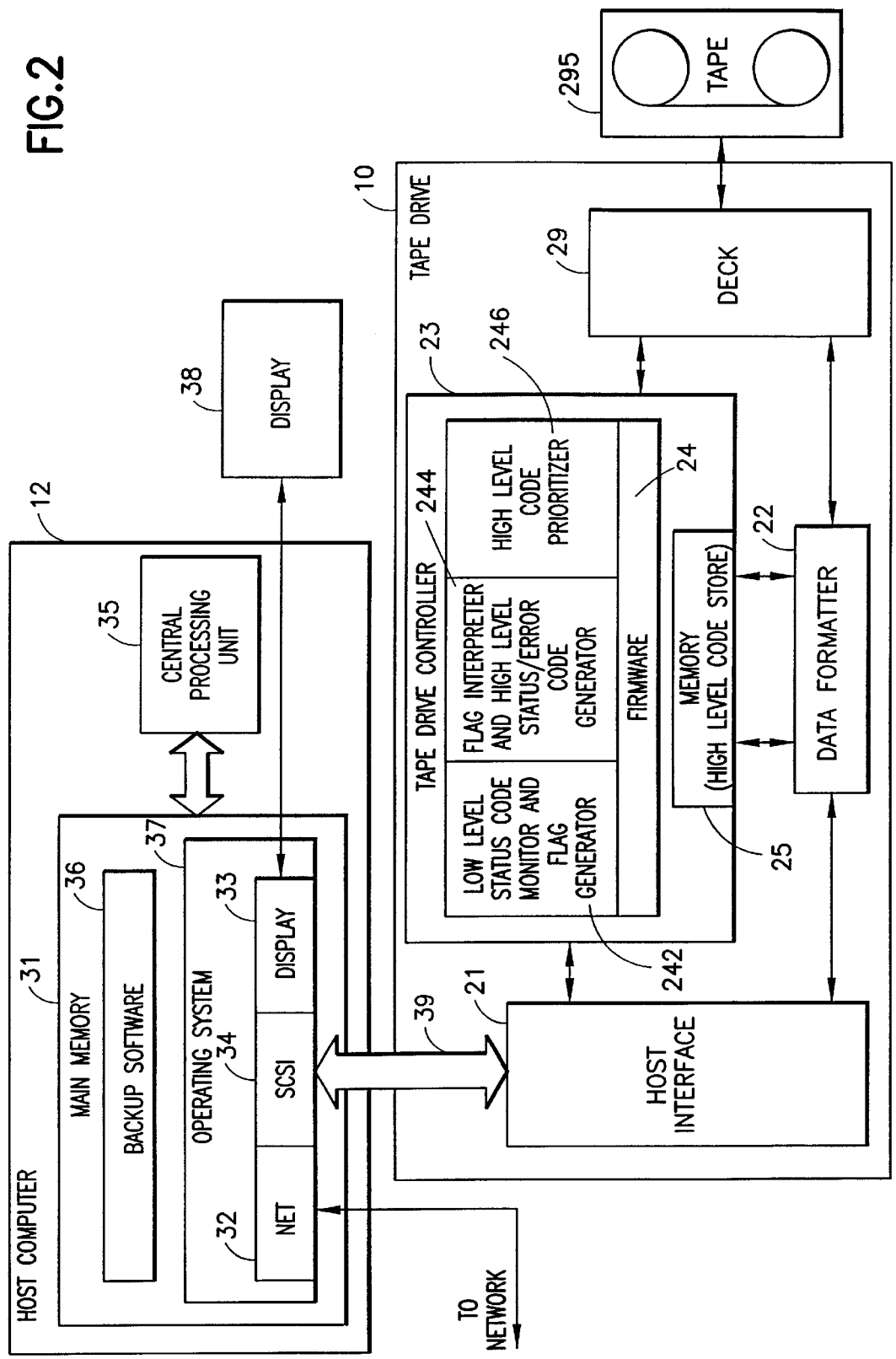
FIG. 2 which shows by way of a functional block diagram the system of FIG. 1.

FIG. 2 is a functional block diagram of the system represented in FIG. 1. In FIG. 2, the tape drive 10 is arranged to store and retrieve data in accordance with the digital data storage (DDS) standard format. The tape drive 10 comprises a host interface unit 21 for interfacing the drive 10 with a host computer 12 via a standard SCSI bus 39. A data formatter 22 in the tape drive 10 processes user data records and separator marks into and out of indexed groups, compresses/decompresses data in a known fashion and effects low-level signal processing, as specified in the DDS format. The low-level processing converts streams of bytes from the groups into track signals ready for recording data to tape and reconverts track signals from tape back into byte streams for reconstructing the groups. The tape drive 10 further comprises a deck 29 of known type comprising electronic circuitry for controlling recording heads and tape operations for writing data to and reading data from a tape medium 295. The tape drive 10 also comprises a tape drive controller 23 for controlling the operation of the other elements of the drive in response to commands received from the host 12 via the host interface unit 21.

The drive 10, controlled by the tape drive controller 23, is arranged to respond to SCSI commands from backup software 36 running the host computer 12 to load/unload a tape, to store a data record or separator mark, to search for selected separator marks or records, and to read back the next record and to compress/decompress data records. These functions are standard tape drive functions and, as such, will not be considered in further detail in this description. For further, more detailed information on DDS tape drives and the respective data format, the reader is referred to European Patent Application EP459041A1.

In accordance with the present embodiment, the tape drive controller 23 incorporates further functionality, which a storage device has hitherto not provided, to support status monitoring and tape drive diagnostics capabilities. This functionality is provided by appropriate firmware processes 24 embedded in the tape drive controller 23. Of the processes: a first process 242 monitors the status of predetermined functions in the tape drive 10 by receiving low level system status codes returned by the other elements of the drive during the operation of the tape drive and, in response, sets flags to indicate possible problems; a second process 244 interprets the flags in a predetermined manner and generates one or more predetermined high level status or error codes; and a third process 246 prioritizes the high level codes, where more than one code exists, in accordance with a pre-defined criteria and stores the results in an area of random access memory (RAM) 25 accessible by the tape drive controller 23. Once stored, the high level codes may be forwarded to the host computer 12, for example by "polling", as described below in more detail. The low level codes, the flags, the high level codes and the priority criteria are also described in detail below.

As also illustrated in FIG. 2, the host computer 12 comprises a standard computing platform running under the control of an operating system 37 such as Windows NT 4.0. Backup controller software 36, stored in main memory 31 and running on a central processing unit 35, is a software process written, for example, in the $C^{++}$ programming language. The backup software 36 is arranged to control the host computer 12 to operate in accordance with the present embodiment. The operating system 37 of the host computer 12 includes: a network driver 32 for transmitting and receiving data, for example in TCP/IP format, to and from a network (not shown); a display driver 33, such as a video graphics array (VGA) driver, to transmit display signals to a display screen 38; and a SCSI driver 34, to transfer commands and data between the host computer 12 and the tape drive 10. The drivers provided support respective standard hardware interfaces.

The backup controller software 36 is arranged to control the host computer 12 to retrieve high level status or error codes which have been stored in the memory 25 from the tape drive 10 by polling the tape drive 10 regularly. Other methods of moving the data from the tape drive 10 to the host computer 12 are described below. Further, the backup controller software 36 is arranged to process any received high level status or error codes and forward to a user appropriate, pre-defined error or action messages. Such messages may be forwarded for display to the user on the display screen 38, and/or across a network to a remote network console (not shown) as necessary.

As mentioned above, the tape drive 10 firmware 24 monitors the status of predetermined functions in the drive and is configured to generate error codes to indicate possible problems—these are referred to herein as 'low-level' error codes. For any given tape drive, these low-level error codes are mapped to 'high level' error conditions so that occurrence of a low-level error condition causes a particular flag or flags to be set. The specific conditions for any one flag to be set and cleared are drive-specific and are defined by the drive manufacturer. If a drive cannot support the recognition of all the flag conditions, then unsupported flags may remain unset.

Low-level error indicators may be grouped into functional types with a set of possible low-level error indicator codes being assigned to each group. The relevant functional types include:

Unrecoverable write error codes;
Unrecoverable read error codes;
Tape management error codes;
Hardware error codes;
Recoverable write error codes;
Recoverable read error codes.

There are also other groups in addition to the above in this embodiment as will be shown later.

If such grouping is done, then flags may be set according to which type of low-level error indicator has occurred. For example, all recoverable write error codes would cause a particular flag to be set, in fact Flag 1 in Table 1 in this embodiment. This feature relieves the tape drive manufacturer of the need to define a mapping from every single low-level error indicator to a particular flag. This feature also facilitates the setting of different flags depending on how many times a particular type of low-level error has occurred.

There are 64 flags defined to cover a wide range of error conditions and these are as shown in Table 1. The column headings in Table 1 are as follows:

No.—this is simply the flag number;

Flag—this is the name of the flag and indicates the error to which it relates;

Type—this indicates the seriousness of the error:

"I"=Information: a suggestion to the user;

"W"=Warning: the user is advised to take action. Performance or data may be at risk;

"C"=Critical!: action should be taken immediately;

Suggested Host Message—this is the text of the message which should be relayed to the user eg. by display on the screen of the host computer;

Cause—this indicates the cause of the error. Where setting of a flag depends on a simple true/false criterion, the cause is given in Table 1. Where setting of a flag depends on the number of times a particular type of error occurs in a predetermined timeframe, details are given in Tables 2 to 4 (to be described).

If a flag will be set repeatedly on repeated triggering of the specified cause, this is indicated by 'R'. If a flag will not be set repeatedly on repeated triggering of the specified cause, this is indicated by 'NR'.

Cleared—this indicates when the flag is cleared.

The flags are grouped as follows:

Flags 1 to 19: For tape drive write/read management

Flags 20 to 29: For cleaning management

Flags 30 to 39: For tape drive hardware errors

Flags 40 to 49: For tape autoloader errors

Flags 50 to 64: Currently unassigned for future use

Table 2 shows the combinations and sequences of error conditions for read-after-write errors. When it is more than 24 hours since the tape drive was last cleaned (State 1), flags 2 and 20 are set on occurrence of a read-after-write (RAW) error. When it is less than 24 hours since the tape drive was last cleaned (State 2), flags 2 and 4 are set on occurrence of a read-after-write (RAW) error.

Table 3 shows the combinations and sequences of error conditions for read errors. When it is more than 24 hours since the tape drive was last cleaned, the tape drive is in State 1 and flags 1 and 20 are set on occurrence of a recoverable read error. If it is less than 24 hours since the tape drive was last cleaned, the defined state toggles between 1 and 2 as recoverable read errors reoccur. In State 2 flags 1 and 4 are set on occurrence of a read error.

Table 4 shows the combinations and sequences of error conditions for unrecoverable (or 'hard') errors. Unrecoverable errors fall into three groups: bard read errors, hard write errors and hardware errors.

When it is more than 24 hours since the tape drive was last cleaned, the tape drive is in State 1. If it is less than 24 hours since the tape drive was last cleaned, the defined state toggles between 1,2 and 3 as hard errors within the three categories reoccur. The events which trigger state changes are listed at the bottom of Table 4 as follows:

Cln—performance of a cleaning cycle;

Md Ej—ejection of the current tape cassette;

Soft Reset—performing a soft reboot;

Hard Reset—powering the tape drive off and on again.

For hard read errors (which include certain media-related errors):

State 1 means that flags 3 and 20 are set;

State 2 means that flags 3 and 4 are set;

State 3 means that flags 3 and 5 are set.

For hard write errors:

State 1 means that flags 3 and 20 are set;

State 2 means that flags 3 and 4 are set;

State 3 means that flags 3 and 6 are set.

For hardware errors:

State 1 means that flags 3 and 30 are set;

Subsequent States means that flags 3 and 31 are set.

Alternatively, it may be that soft resets are not a recommended error recovery step, in which case a hardware error code means that flags 3 and 30 will always be set independently of how many times a hardware error has occurred.

It can be seen from Tables 2,3 and 4 above that the elapsed time since the tape drive was last cleaned is relevant to the defined state which in turn influences which flags are set.

The following is a description of different possible error scenarios and the error messages that would result, including references to the relevant ones of Tables 1 to 4 in each case. These scenarios correspond closely to the functional types of low-level errors mentioned above.

There is a 'caution' LED on the tape drive 10 (not shown in FIG. 1) which is normally lit if there is a problem.

1. DRIVE RECOVERABLE READ PROBLEMS (Table 3)

If the tape drive experiences a severe problem reading, then the yellow caution LED is lit. Data is still read from the tape without error, but with loss of capacity. The recommended recovery procedure is to try cleaning the tape drive, then to try a different piece of media, and finally if the problem persists to seek technical support.

The first time the error is detected, the following error messages would be displayed:

WARNING: The tape drive is having problems reading data. No data has been lost, but there has been a reduction in the capacity of the tape.

CRITICAL: The tape drive needs cleaning:

1. If the operation has stopped, eject the tape and clean the drive

2. If the operation has not stopped, continue and clean the drive when finished.

If the error persists, then the next set of error messages to be displayed is:

WARNING: The tape drive is having problems reading data. No data has been lost, but there has been a reduction in the capacity of the tape.

CRITICAL: Your data is at risk:

1. Copy any data you require from this tape.

2. Do not use this tape again.

3. Restart the operation with a different tape.

This cycle repeats each time the error condition is detected again.

2. DRIVE RECOVERABLE WRITE PROBLEMS (Table 2)

If the tape drive experiences a severe problem writing, then the yellow caution LED is lit. Data is still written to the tape without error, but with loss of capacity. The recommended recovery procedure is to try cleaning the drive, then to try a different piece of media, and finally if the problem persists to seek technical support.

The first time the error is detected, the following error messages would be displayed:

WARNING: The tape drive is having problems writing data. No data has been lost, but there has been a reduction in the capacity of the tape.

CRITICAL: The tape drive needs cleaning:

1. If the operation has stopped, eject the tape and clean the drive

2. If the operation has not stopped, continue and clean the drive when finished.

If the error persists, then the next set of error messages to be displayed is:

WARNING: The tape drive is having problems writing data. No data has been lost, but there has been a reduction in the capacity of the tape.

CRITICAL: Your data is at risk:

1. Copy any data you require from this tape.

2. Do not use this tape again.

3. Restart the operation with a different tape.

This cycle repeats each time the error condition is detected again.

3. DRIVE UNRECOVERABLE READ PROBLEMS (Table 4)

If the tape drive experiences an unrecoverable read failure, then the yellow caution LED is lit and the user's backup job fails. The recommended recovery procedure is to try cleaning the tape drive, then to try a different piece of media, and if the problem persists, to seek technical support.

The first time the error is detected, the following error messages would be displayed:

WARNING: The operation has stopped because an error has occurred while reading or writing data which the tape drive cannot correct CRITICAL: The tape drive needs cleaning:

1. If the operation has stopped, eject the tape and clean the drive

2. If the operation has not stopped, continue and clean the drive when finished.

If the error persists, then the next set of error messages to be displayed is:

WARNING: The operation has stopped because an error has occurred while writ data which the tape drive cannot correct CRITICAL: Your data is at risk:

1. Copy any data you require from this tape.

2. Do not use this tape again.

3. Restart the operation with a different tape.

If the error persists, then the next set of error messages to be displayed is:

WARNING: The operation has stopped because an error has occurred while reading or writing data which the tape drive cannot correct CRITICAL: The tape is damaged or the drive is faulty. Call the tape supplier helpline.

4. DRIVE UNRECOVERABLE PROBLEMS (Table 4)

If the tape drive experiences an unrecoverable write failure, then the yellow caution LED is lit and the user's backup job fails. The recommended recovery procedure is to try cleaning the drive, then to try a different piece of media, and if the problem persists, to seek technical support. The first time the error is detected the following error messages would be displayed:

WARNING: The operation has stopped because an error has occurred while reading or writing data which the tape drive cannot correct CRITICAL: The tape drive needs cleaning:

1. If the operation has stopped, eject the tape and clean the drive

2. If the operation has not stopped, continue and clean the drive when finished.

If the error persists, then the same set of error messages is displayed again:

WARNING: The operation has stopped because an error has occurred while reading or writing data which the tape drive cannot correct CRITICAL: Your data is at risk:

1. Copy any data you require from this tape.

2. Do not use this tape again.

3. Restart the operation with a different tape.

If the error persists, then the next set of error messages to be displayed is:

WARNING: The operation has stopped because an error has occurred while reading or writing data which the tape drive cannot correct CRITICAL: The tape is from a faulty batch or the tape drive is faulty:

1. Use a good tape to test the drive.

2. If the problem persists, call the tape drive supplier helpline.

5. DRIVE HARDWARE PROBLEMS (Table 4)

If the tape drive experiences a hardware self-test failure after power-on, then the yellow caution LED is lit and the backup controller software will report that the tape drive cannot be used. The recommended recovery procedure is to try 'power cycling' the drive (turning the tape drive off and then on again). Finally, if the problem persists, technical support should be sought. The following error message would be displayed:

CRITICAL: The tape drive has a hardware fault:

1. Turn the tape drive off and then on again.

2. Restart the operation.

3. If problem persists, call the tape drive supplier helpline.

6. MEDIA WORN OUT (Table 1)

When the media being used has reached the end of its useful life (maximum number of passes exceeded) then the data on it should be copied to new media and the old media discarded. There is normally no user visibility of media wear, and thus the media will continue being used until it triggers one of the read/write error conditions. The following error message would be displayed:

WARNING: The tape cartridge has reached the end of its useful life:

1. Copy any data you need to another tape

2. Discard the old tape.

7. CLEANING TAPE EXPIRED (Table 1)

When the cleaning tape being used wears out, it should be discarded and a new cleaning tape used if possible. Unless the user is made aware of the problem, the worn cleaning tape might well continue being used until it triggers one of the read/write error conditions. To alert the user the following error message would be displayed:

CRITICAL: The last cleaning cartridge used in the tape drive has worn out:

1. Discard the worn out cleaning cartridge.
2. Wait for the current operation to finish.
3. Then use a new cleaning cartridge.

8. PERIODIC CLEANING REQUIRED (Table 1)

When the tape drive is due for periodic cleaning, a cleaning cycle should be performed. Unless the user is made aware of the need for a cleaning cycle, the tape drive might well continue being used until lack of cleaning triggers one of the read/write error conditions. To alert the user, the following error message would be displayed:

WARNING: The tape drive is due for routine cleaning:

1. Wait for the current operation to finish.
2. Then use a cleaning cartridge.

9. NON-DATA GRADE MEDIA USED (Table 1)

When the media being used is not data grade, the data stored on it is at risk. Unless the user is made aware of the problem, the media might well continue being used until it triggers one of the read/write error conditions. The user should copy any data they need from the media onto data grade media and discard the non-data grade media. To alert the user the following error message would be displayed:

WARNING: The tape cartridge is not data-grade. Any data you back up to the tape is at risk.

Replace the cartridge with a data-grade tape.

10. ABNORMAL ERROR CONDITIONS (Table 1)

If an abnormal error condition occurs, due to user or backup application error, then in known systems there will be unexplained failures. One example is if the backup controller software fails to note that the cartridge loaded is write protected and thus fails the backup operation. In a system implementing the present invention, the following error message would explain this:

CRITICAL: You are trying to write to a write-protected cartridge.

Remove the write-protection or use another tape.

Another example is if the user tries to eject the cartridge when it has been locked in the drive by the backup controller software. The following error message would explain why the cartridge was not ejected:

INFORMATION: You cannot eject the cartridge because the tape drive is in use.

Wait until the operation is complete before ejecting the cartridge.

Also, in the case of an autoloader, the cleaning cartridge may be used in error for a backup or restore, thus causing unexplained failures. The following error message would explain this:

INFORMATION: The tape in the drive is a cleaning cartridge.

If you want to back up or restore, insert a data-grade tape.

11. UNSUPPORTED TAPE FORMAT (Table 1)

If a tape cartridge is loaded in the tape drive that is an unsupported format, it will be automatically ejected by the tape drive. The following error message would explain why the cartridge was ejected:

INFORMATION: You have tried to load a cartridge of a type which is not supported by this drive.

The cartridge has been automatically ejected

12. FIRMWARE DOWNLOAD FAILURE (Table 1)

If an attempt is made to download incorrect firmware into the tape drive, the download will not succeed. The following error message notifies the user that the firmware download failed:

WARNING: The firmware download has failed because you have tried to use the incorrect firmware for this tape drive.Obtain the correct firmware and try again.

13. AUTOLOADER HARDWARE INTERFACE ERROR (Table 1)

In the case of an autoloader, if there is a problem with the tape autoloader where the tape drive cannot communicate correctly with the changer mechanism, the autoloader will not function correctly, and the backup operation fails. The recommended recovery procedure is to try powering the tape drive off then on again, and finally if the problem persists to seek technical support. The following error messages would be displayed:

CRITICAL: The changer mechanism is having difficulty communicating with the tape drive:

1. Turn the autoloader off and then on again.
2. Restart the operation.
3. If the problem persists, call the tape drive supplier helpline.

14. AUTOLOADER STRAY TAPE (Table 1)

In the case of an autoloader, it is possible for a tape to be left inside the autoloader after an error, preventing the autoloader from functioning correctly, and the user's backup operation will fail. The recommended recovery procedure is to try inserting an empty magazine into the autoloader, then if the backup operation is still failing, powering the tape drive off then on again, and finally if the problem persists to seek technical support. The following error message would be displayed:

CRITICAL: A tape has been left in the autoloader by a previous hardware fault:

1. Insert an empty magazine to clear the fault.
2. If the fault does not clear, turn the autoloader off and then on again.
3. If the problem persists, call the tape drive supplier helpline.

15. AUTOLOADER MECHANISM HARDWARE ERROR (Table 4, if applicable)

In the case of an autoloader, if there is a problem with the tape autoloader mechanism/robotics, the autoloader will not function correctly, and the user's backup operation fails. The recommended recovery procedure is to try ejecting the magazine, then to try a soft reset (holding down the eject button for several seconds without a tape loaded in the drive), then to try powering the tape drive off then on again, and finally if the problem persists to seek technical support. The first time the error is detected the following error messages would be displayed:

WARNING: There is a problem with the autoloader mechanism.

CRITICAL:The operation has failed:

1. Eject the tape or magazine.
2. Insert the tape or magazine again.
3. Restart the operation.

If the problem is detected again, then the following error messages are displayed:

WARNING: There is a problem with the autoloader mechanism.

CRITICAL:The tape drive has a hardware fault:

1. Eject the tape or magazine
2. Reset the drive (hold eject button down for 5 seconds).
3. Restart the operation.

If the problem is detected again, then the following error messages are displayed:

WARNING: There is a problem with the autoloader mechanism.

CRITICAL:The tape drive has a hardware fault:

1. Turn the tape drive off and then on again.
2. Restart the operation.
3. If the problem persists, call the tape drive supplier helpline.

16. AUTOLOADER DOOR OPEN (Table 1)

In the case of an autoloader, if the door of the autoloader has not closed correctly after loading a magazine, then the autoloader will not function and the backup operation fails. The, recommended recovery procedure is to try closing the door of the autoloader, then if the backup operation is still failing, powering the tape drive off then on again, and finally if the problem persists to seek technical support. The following error message would be displayed CRITICAL: The operation has failed because the autoloader door is open:

1. Clear any obstructions.
2. Eject the magazine and then insert it again.
3. If the fault does not clear, turn the autoloader off and then on again.
4. If the problem persists, call the tape drive supplier helpline.

The way in which the backup controller software in the host computer 12 interfaces with the tape drive 10 will now be described.

A well-known feature of the standard SCSI interface is the use of 'log sense' pages to record peripheral status information and 'mode sense' pages to record functional and configuration settings.

The error information contained in Table 1 is stored by the tape drive 10 in a 'Log Sense' page. The format of the Log Sense page is shown in Table 5. Each line in the Log Sense page represents one byte of data and the entries are numbered down the lefthand side of Table 5. A description of the entries is as follows:

Entry 0—the name of the page (2e in this example);

Entry 1—reserved for future use;

Entry 2—the length of the particular page (2 bytes long);

Entry 3—the remainder of the page length;

Entry 4—the SCSI standard uses parameters and this is the name of the current parameter (2 bytes long). In this embodiment, each parameter corresponds to one of the flags in Table 1;

Entry 5—the remainder of the parameter name;

Entry 6—the parameter control byte. The fields are explained below. The terms 'sense key' and 'sense code' are commonly used in relation to the SCSI standard to refer to codes for the type of error and details of the error, respectively:

DU=Disable Update: a value of zero means that the tape drive will not update the log parameter value (Entry 8 below). A value of one means that the tape drive will not update the log parameter value except in response to a Log Select command that specifies a new value for the log parameter. The DU bit is undefined and ignored if the PC bit (part of the page code) in the Log Sense command is set to 0×00 (as in this embodiment);

DS=Disable Save: a value of zero means that the tape drive supports saving for that log parameter. A value of one means means that saveable parameters are not supported;

TSD=Tape drive Save Disable: a value of zero means that the tape drive provides a tape drive-defined method for saving log parameters. A value of one means that the tape drive does not provide a tape drive-defined method of saving log parameters;

ETC=Enable threshold comparison: a value of one means that comparison to the threshold value is performed. A value of zero means that a comparison is not performed;

TMC=Threshold Met Criteria: defines the basis for the comparison of the parameter value. Only valid if ETC=1. If the ETC=1 and the comparison is true, a check condition will be generated. The Sense key is then set to UNIT ATTENTION and the additional sense code is set to THRESHOLD CONDITION MET;

LP=List Parameter: indicates the format of the log parameter. A value of zero means that the parameter is a data counter. A value of one means that the parameter is a list parameter, and then the ETC and TMC field must be set to zero;

Entry 7—the length of the current parameter;

Entry 8—the actual parameter. In this case it is the first flag, namely the Read Flag. In this embodiment only one bit is used for each flag;

Entry 9 and so on—corresponding entries for the subsequent parameters (flags). There are two methods by which the host computer 12 can access error information in the tape drive 10. The first method is "polling" where the Log Sense page is read from the tape drive at the following times as a minimum:

1. Immediately after a SCSI Check Condition/Request Sense cycle. This is a standard cycle in which the drive makes an error status report and if there is an error this is indicated as a 'Check Condition'. The host then sends a 'Request Sense' command to get details of the error.

2. At the end of each tape when the backup/restore job spans multiple tapes. If the tape is to be ejected then the Log Sense page must be read before ejection.

3. At the end of a backup/restore job.

It is also recommended to poll the Log Sense page every 60 seconds while the tape drive is idle.

The second access method is to use the SCSI 'Mode Select' command to enable the "Check Condition" mode, so that the tape drive will report a Check Condition on the next SCSI a command after one or more flags are set. If this SCSI command should return a Check Condition due to an actual error, then this will override the Check Condition 'forced' by the Mode Select command. The Log Sense page will therefore be read from the tape drive after every Check Condition/Request Sense cycle (both forced check conditions and error check conditions). The Request Sense extended sense code (this is the code reported by the tape drive) for a check condition is 5D00, and the command that triggered this Check Condition will have been executed, thus the backup controller software will not repeat the command that triggered a Check Condition.

The recommended method is "check condition" rather than "polling" since this guarantees that the backup controller software will be made aware of any flag being set. With "polling" there are theoretical corner-cases where flag information could be missed, though the higher the polling frequency the less chance there is of this happening.

The method of access to the tape drive can be configured via the SCSI bus, based on a new Mode Sense page. The interface can be configured via the Mode Select command using the same page format to write the configuration as to read it (Mode Sense command). The format of this new Mode Sense page is as shown in Table 6.

Again each entry in the Mode Sense page is one byte long. The entries are as follows:

Entry 0—the name of the page (1C in this example);

Entry 1—the length of the particular page;

The following fields are in the remainder of the Mode Sense page:

DExcpt: When this bit is set to zero the reporting method indicated by the MRIE field is used. When this bit is set to one this indicates that the tape drive will ignore the MRIE field (so that the backup controller software must poll the Log Sense page). Thus to enable "check condition" mode, this bit must be set to zero.

In this embodiment, the default setting is 1, and this is configurable via Mode Select Test: When this bit is set to zero, this indicates that the tape drive will not generate any false flags. When this bit is set to one, the tape drive will set a false flag based on the MRIE and Interval Timer flags. Thus the next SCSI command after the Mode Select command will return Check Condition, with sense key set to UNIT ATTENTION and extended sense code set to 5DFF (a test code). If both the Test and DExcpt bits are set to one, then the Mode Select command will return Check Condition, with sense key set to Illegal Request and extended sense code set to INVALID FIELD in the Parameter List.

In this embodiment, the default setting is 0, configurable via Mode Select

Perf: When this bit is set to zero, this indicates that flag setting operations that can cause delays are acceptable. When this bit is set to one, the tape drive will not cause delays while setting flags (this may cause the tape drive to disable some or all of the flag setting operations).

In this embodiment, the default setting is 0, not changeable via Mode Select

LogErr: When this bit is set to zero, this indicates that the logging of flags set within a tape drive is vendor specific. When this bit is set to one, the tape drive will log flags set.

In this embodiment, the default setting is 0, not changeable via Mode Select

MRIE: This field indicates the method used by the tape drive to report flags set. The priority of reporting flags set is tape drive specific. If the access method being used is the one described above using the Mode Select command to enable the "Check Condition" mode, so that the tape drive will report a Check Condition on the next SCSI command after one or more flags are set then, in the event that the SCSI command should return a Check Condition due to an actual error, then this will override the forced Check Condition. The values defined for this field are:

Ox1: No reporting of flags set

Ox2: Generate Unit Attention: tape drive returns Check Condition on the next SCSI command after a flag is set, with the sense key set to UNIT ATTENTION and the extended sense code set to 5D00. The command that triggered the forced Check Condition will not have been executed, and thus needs to be repeated;

0x3: Conditionally generate Recovered Error: depending on the value of the tape drive error recovery settings, the tape drive returns Check Condition on the next SCSI command after setting of a flag was detected, with the sense key set to RECOVERED ERROR and the extended sense code set to 5D00. The command that has triggered the forced Check Condition will have been executed correctly, and thus does not need to be repeated;

0x4: Unconditionally generate Recovered Error: regardless of the value of the tape drive error recovery settings, the tape drive returns Check Condition on the next SCSI command after setting of a flag was detected, with the sense key set to RECOVERED ERROR and the extended sense code set to 5D00. The command that has triggered the forced Check Condition will have been executed correctly, and thus does not need to be repeated;

0x5: Generate No Sense: tape drive returns Check Condition on the next SCSI command after setting of a flag was detected, with the sense key set to NO SENSE and the extended sense code set to 5D00. The command that has triggered the check condition will have been executed correctly, and thus doe; not need to be repeated;

0x6: Only report on request:tape drive will preserve the flag(s) set. The backup controller software then polls the tape drive using the Log Sense command.

In this embodiment, the default setting is 3, not changeable via Mode Select.

Interval Timer. When this field is set to zero, this indicates that the tape drive will only set a flag once. When this field is set to non-zero, the value indicates the period in 100 millisecond increments for resetting a flag. The tape drive will not set flags more frequently than the specified timer interval and will set flags as soon as possible after the timer interval has elapsed. A value of 0xFFFFFFFF in the field indicates that the timer interval is tape drive specific.

In this embodiment, the default setting is 0, not changeable via Mode Select

Report Count: When this field is set to zero, this indicates that there is no limit to the number of times the tape drive will report a flag being set (assuming that Interval Timer is set to non-zero). When this field is set to non-zero, this indicates the number of times to report a flag being set.

In this embodiment, the default setting is 0, not changeable via Mode Select.

Every time the Log Sense page is read from the tape drive, the backup controller software reads all 64 flags to discover which are set (there is often more than one). There may also be data associated with a set flag in the remainder of the flag byte, which should also be read. The flags will automatically be cleared by the tape drive without action from the software, and thus any set flags read by the backup controller software indicate a new event. The software therefore will not latch any flag states but will always action any set flag detected.

A particular backup controller may be connected to more than one tape drive. In addition, for each tape drive, there will be a plurality of tape cassettes used for backing up data. Each tape cassette is given a 'software label' to identify it.

For every flag that is set, the backup controller software will log the error message specified in Table 1 along wit details to identify which tape drive the error refers to, and the software label of the media for media related actions (flags 4 and 7). The severity of the error is identified based on the flag Type field in Table 1.

For every flag that is set, the backup controller software notifies the user through its normal notification methods (e.g. broadcast, email, SNMP, etc.), displaying the specified error message along with details to identify which tape drive the error refers to, and the software label of the media for media related actions (flags 4 and 7). The notification identifies the severity of the error, and when multiple flags are set simultaneously they are listed in ascending order of severity (Information/Warning/Critical). It is possible to include error message filters in the backup controller software so that only errors of a certain severity are notified to the user and/or specifying the mode of notification of errors of different severity. When multiple flags are set simultaneously, they may be associated together as a single error event, for example by displaying all of the associated error messages together in one dialogue box.

The backup controller software does not fail a backup job based on the flag information. Rather, setting of the flags provides preventative maintenance information such that the user or the backup controller software can initiate actions to prevent the failure occurring at all, and thus increases the reliability of the backup system. This facility also provides assistance in diagnosing/recovering a failing backup job.

The backup controller software may be configured to automate the recommended maintenance/recovery actions, particularly if there are multiple tape drives or autochangers present. For example, it could trigger performance of a cleaning cycle for flags 20 and 21, or a tape copy for flags 4 and 7, and retire the suspect media.

Typically, the backup controller software will be loaded into the memory of the host computer from a computer readable data carrying medium such as a floppy disk, mini-disk or optical disk (CD ROM. Alternatively, the software could be down-loaded accross, a network such as the Internet from a source such as a World Wide Web or FTP server.

The above embodiment relates to a tape drive but it will be understood that the present invention is relevant to any storage device which uses removable media and so is also relevant to optical disc drives.

TABLE 1

| No | Flag | Type | Required Host Message | Cause | Cleared |
|----|------|------|----------------------|-------|---------|
| 1 | Read | W | The tape drive is having problems reading data. No data has been lost, but there has been a reduction in the capacity of the tape. | See subsequent tables | |
| 2 | Write | W | The tape drive is having problems writing data. No data has been lost, but there has been a reduction in the capacity of the tape. | See subsequent tables | |
| 3 | Hard Error | W | The operation has stopped because an error has occurred while reading or writing data which the drive cannot correct. | See subsequent tables | |
| 4 | Media | C | Your data is at risk: 1. Copy any data you require from this tape. 2. Do not use this tape again. 3. Restart the operation with a different tape. | See subsequent tables | |

TABLE 1-continued

| No | Flag | Type | Required Host Message | Cause | Cleared |
|----|------|------|----------------------|-------|---------|
| 5 | Read Failure | C | The tape is damaged or the drive is faulty. Call the tape supplier helpline. | See subsequent tables | |
| 6 | Write Failure | C | The tape is from a faulty batch or the tape drive is faulty: 1. Use a good tape to test the drive. 2. If the problem persists, call the tape drive supplier helpline. | See subsequent tables | |
| 7 | Media Life | W | The tape cartridge has reached the end of its useful life: 1. Copy any data you need to another tape 2. Discard the old tape. | The media has exceeded its specified life (NR) | On tape eject |
| 8 | Not Data Grade | W | The tape cartridge is not data-grade. Any data you back up to the tape is at risk. Replace the cartridge with a data-grade tape. | Load of Non data grade media data grade detect enabled (N/A) Write attempt to Non data grade media data grade detect enabled (R) | On tape eject |
| 9 | Write Protect | C | You are trying to write to a write-protected cartridge. Remove the write-protection or use another tape. | Write command is attempted to a write protected tape (R) | On tape eject |
| 10 | No Removal | I | You cannot eject the cartridge because the tape drive is in use. Wait until the operation is complete before ejecting the cartridge. | Manual or s/w unload attempted when prevent media removal on (R) | On lock removal |
| 11 | Cleaning Media | I | The tape in the drive is a cleaning cartridge. If you want to back up or restore, insert a data-grade tape. | Cleaning tape encountered during backup or restore (R) | On tape eject |
| 12 | Unsupported Format | I | You have tried to load a cartridge of a type which is not supported by this drive. The cartridge has been automatically ejected. | Attempted loaded of unsupported tape format, e.g. DDS2 in DDS1 drive | On load of valid format tape (including cleaning tape) |
| 13 | Snapped Tape | C | The operation has failed because the tape in the drive has snapped: 1. Discard the old tape. 2. Restart the operation with a different tape. | Tape snapped in the drive (NR) | On next media load |
| 20 | Clean Now | C | The tape drive needs cleaning: 1. If the operation has stopped, eject the tape and | See subsequent tables | |

TABLE 1-continued

| No | Flag | Type | Required Host Message | Cause | Cleared |
|---|---|---|---|---|---|
| | | | clean the drive<br>2. If the operation has not stopped, wait for it to finish and then clean the drive. | | |
| 21 | Clean Periodic | W | The tape drive is due for routine cleaning:<br>1. Wait for the current operation to finish.<br>2. Then use a cleaning cartridge. | | Not Supported |
| 22 | Expired Cleaning Media | C | The last cleaning cartridge used in the tape drive has worn out:<br>1. Discard the worn out cleaning cartridge.<br>2. Wait for the current operation to finish.<br>3. Then use a new cleaning cartridge. | The cleaning tape has expired (R) | Until a valid clean is carried out |
| 30 | Hardware A | C | The tape drive has a hardware fault:<br>1. Eject the tape or magazine.<br>2. Reset the drive (hold the unload button down for 5 seconds).<br>3. Restart the operation. | | See subsequent tables |
| 31 | Hardware B | C | The tape drive has a hardware fault:<br>1. Turn the tape drive off and then on again.<br>2. Restart the operation.<br>3. If the problem persists, call the tape drive supplier helpline. | | See subsequent tables |
| 32 | Interface | W | The tape drive has a problem with the SCSI interface:<br>1. Check the cables and cable connections.<br>2. Restart the operation. | | The drive has identified an interfacing fault |
| 33 | Eject Media | C | The operation has failed:<br>1. Eject the tape or magazine.<br>2. Insert the tape or magazine again.<br>3. Restart the operation. | | Error recovery action |
| 34 | Download Fail | W | The firmware download has failed because you have tried to use the incorrect firmware for this tape drive. Obtain the correct firmware and try again. | | Firmware download failed |
| 40 | Loader Hardware A | C | The changer mechanism is having difficulty communicating with the tape drive:<br>1. Turn the autoloader off then on.<br>2. Restart the operation.<br>3. If problem persists, call the tape drive supplier helpline. | | Loader mech. is having trouble communicating with the tape drive |
| 41 | Loader Stray Tape | C | A tape has been left in the autoloader by a previous hardware fault:<br>1. Insert an empty magazine to clear the fault.<br>2. If the fault does not clear, turn the autoloader off and then on again.<br>3. If the problem persists, call the tape drive supplier helpline. | | Stray tape left in loader after pervious error recovery |
| 42 | Loader Hardware B | W | There is a problem with the autoloader mechanism. | | See subsequent tables |
| 43 | Loader Door | C | The operation has failed because the autoloader door is open:<br>1. Clear any obstructions from the autoloader door.<br>2. Eject the magazine and then insert it again.<br>3. If the fault does not clear, turn the autoloader off and then on again<br>4. If the problem persists, call the tape drive supplier helpline. | | Tape changer door open |
| 64 | | | | | |

TABLE 2

| | | | RAW Retries | |
|---|---|---|---|---|
| No | | Criteria | State 1 | State 2 |
| 1 | Read | The Tape Drive is having problems reading data | | |
| 2 | Write | The Tape Drive is having problems writing data | SET | SET |
| 3 | Hard Error | A Hard Error has occurred | | SET |
| 4 | Media | You are advised to copy any data that you need to another tape and discard this tape | | SET |
| 5 | Read Fail | You may either have a damaged tape, or the tape drive is faulty. Please call the service engineer | | |
| 6 | Write Fail | You may either have a faulty batch of media, or the tape drive is faulty. Please use known good media or call the service engineer | | |
| 20 | Clean Now | The tape drive heads need cleaning, use a cleaning cartridge now. | SET | |
| 30 | Hardware A | The tape drive has a hardware fault, try a soft reset | | |
| 31 | Hardware B | The tape drive has a hardware fault, try powering the tape drive off and then on again | | |
| | State Change | | | State Machine: States 1/2 |
| | Criteria | | | State 1 if >24 hrs from last clean<br>State 2 if <24 hrs from last clean |

TABLE 3

| | | | Read Retries | |
|---|---|---|---|---|
| No | | Criteria | State 1 | State 2 |
| 1 | Read | The Tape Drive is having problems reading data | SET | SET |
| 2 | Write | The Tape Drive is having problems writing data | | |
| 3 | Hard Error | A Hard Error has occurred | | |
| 4 | Media | You are advised to copy any data that you need to | | SET |

TABLE 3-continued

| | Criteria | Read Retries State 1 | State 2 |
|---|---|---|---|
| | another tape and discard this tape | | |
| 5 Read Fail | You may either have a damaged tape, or the tape drive is faulty. Please call the service engineer | | |
| 6 Write Fail | You may either have a faulty batch of media, or the tape drive is faulty. Please use known good media or call the service engineer | | |
| 20 Clean Now | The tape drive heads need cleaning, use a cleaning cartridge now | SET | |
| 30 Hardware A | The tape drive has a hardware fault, try a soft reset | | |
| 31 Hardware B | The tape drive has a hardware fault, try powering the tape drive off and then on again | | |
| State Change Criteria | | | Any tape load Cycle 121212 etc Except state 1 if >24 hrs from last clean |

TABLE 4

| | Criteria | Read Error Codes: 9X+ Tape Mgmt | | | Write Error Codes: 8X+ Tape Mgmt | | | Hardware Error Codes: | |
|---|---|---|---|---|---|---|---|---|---|
| | Occurrence | 1st | 2nd | 3rd | 1st | 2nd | 3rd | 1st | 2nd and subs |
| 1 Read | The Tape Drive is having problems reading data | | | | | | | | |
| 2 Write | The Tape Drive is having problems writing data | | | | | | | | |
| 3 Hard Error | A Hard Error has occurred | Set | Set | Set | Set | Set | Set | Set | Set |
| 4 Media | You are advised to copy any data that you need to another tape and discard this tape | | Set | | | Set | | | |
| 5 Read Failure | You may either have a damaged tape, or the tape drive is faulty. Please call the service engineer | | | Set | | | | | |
| 6 Write Failure | You may either have a faulty batch of media, or the tape drive is faulty. Please use known good media or call the service engineer | | | | | | Set | | |
| 20 Clean Now | The tape drive heads need cleaning, use a | Set | | | Set | | | | |

TABLE 4-continued

| | Criteria Occurrence | Read Error Codes: 9X + Tape Mgmt | | | Write Error Codes: 8X + Tape Mgmt | | | Hardware Error Codes: | |
|---|---|---|---|---|---|---|---|---|---|
| | | 1st | 2nd | 3rd | 1st | 2nd | 3rd | 1st | 2nd and subs |
| | cleaning cartridge now | | | | | | | | |
| 30 Hardware A | The tape drive has a hardware fault, try a soft reset | | | | | | | Set | |
| 31 Hardware B | The tape drive has a hardware fault, try powering the tape drive off and then on again | | | | | | | Set | |
| State Change Cycle pattern | | Cln | Md Ej | Md Ej | Cln | Md Ej | Md Ej | Soft Reset | Hard Reset |
| | | | | 123123123etc Except state 1 if >24 hours from last clean | | | | | N/A |

TABLE 5

| | 7 | 6 | 5 | 4 | 3 | 2 | 1 | 0 |
|---|---|---|---|---|---|---|---|---|
| 0 | | | | Page Code 0x2e | | | | |
| 1 | | | | Reserved (0) | | | | |
| 2 | | | | Page Length | | | | |
| 3 | | | | | | | | |
| 4 | | | | Parameter Code (1) | | | | |
| 5 | | | | | | | | |
| 6 | DU(0) | DS(1) | TSD(0) | ETC(0) | TMC(0) | Res(0) | | LP(0) |
| 7 | | | | Parameter Length (1) | | | | |
| 8 | | | | Read Flag | | | | |
| 9 | | | | Parameter Code (2) | | | | |
| 10 | | | | | | | | |
| 11 | DU(0) | DS(1) | TSD(0) | ETC(0) | TMC(0) | Res(0) | | LP(0) |
| 12 | | | | Parameter Length (1) | | | | |
| 13 | | | | Write Flag | | | | |
| 14 | | | | Parameter Code (3) | | | | |
| 15 | | | | | | | | |
| 16 | DU(0) | DS(1) | TSD(0) | ETC(0) | TMC(0) | Res(0) | | LP(0) |
| 17 | | | | Parameter Length (1) | | | | |
| 18 | | | | Hard Error Flag | | | | |
| 19 | | | | Parameter Code (4) | | | | |
| 20 | | | | | | | | |
| 21 | DU(0) | DS(1) | TSD(0) | ETC(0) | TMC(0) | Res(0) | | LP(0) |
| 22 | | | | Parameter Length (1) | | | | |
| 23 | | | | Media Flag | | | | |
| 24 | | | | Parameter Code (5) | | | | |
| 25 | | | | | | | | |
| 26 | DU(0) | DS(1) | TSD(0) | ETC(0) | TMC(0) | Res(0) | | LP(0) |
| 27 | | | | Parameter Length (1) | | | | |
| 28 | | | | Read Failure Flag | | | | |
| 29 | | | | Parameter Code (6) | | | | |
| 30 | | | | | | | | |
| 31 | DU(0) | DS(1) | TSD(0) | ETC(0) | TMC(0) | Res(0) | | LP(0) |
| 32 | | | | Parameter Length (1) | | | | |
| 33 | | | | Write Failure Flag | | | | |
| 34 | | | | Parameter Code (7) | | | | |
| 35 | | | | | | | | |
| 36 | DU(0) | DS(1) | TSD(0) | ETC(0) | TMC(0) | Res(0) | | LP(0) |
| 37 | | | | Parameter Length (1) | | | | |
| 38 | | | | Media Life Flag | | | | |
| 39 | | | | Parameter Code (8) | | | | |
| 40 | | | | | | | | |
| 41 | DU(0) | DS(1) | TSD(0) | ETC(0) | TMC(0) | Res(0) | | LP(0) |
| 42 | | | | Parameter Length (1) | | | | |
| 43 | | | | Not Data Grade Flag | | | | |
| 44 | | | | Parameter Code (9) | | | | |
| 45 | | | | | | | | |
| 46 | DU(0) | DS(1) | TSD(0) | ETC(0) | TMC(0) | Res(0) | | LP(0) |
| 47 | | | | Parameter Length (1) | | | | |
| 48 | | | | Write Protect Flag | | | | |
| 49 | | | | Parameter Code (0xA) | | | | |
| 50 | | | | | | | | |
| 51 | DU(0) | DS(1) | TSD(0) | ETC(0) | TMC(0) | Res(0) | | LP(0) |
| 52 | | | | Parameter Length (1) | | | | |
| 53 | | | | No Removal Flag | | | | |
| 54 | | | | Parameter Code (0xB) | | | | |
| 55 | | | | | | | | |
| 56 | DU(0) | DS(1) | TSD(0) | ETC(0) | TMC(0) | Res(0) | | LP(0) |
| 57 | | | | Parameter Length (1) | | | | |
| 58 | | | | Cleaning Media Flag | | | | |
| 59 | | | | Parameter Code (0xC) | | | | |
| 60 | | | | | | | | |
| 61 | DU(0) | DS(1) | TSD(0) | ETC(0) | TMC(0) | Res(0) | | LP(0) |
| 62 | | | | Parameter Length (1) | | | | |
| 63 | | | | Unsupported Format Flag | | | | |
| 64 | | | | Parameter Code (0xD) | | | | |
| 65 | | | | | | | | |
| 66 | DU(0) | DS(1) | TSD(0) | ETC(0) | TMC(0) | Res(0) | | LP(0) |
| 67 | | | | Parameter Length (1) | | | | |
| 68 | | | | Tape Snapped Flag | | | | |

TABLE 5-continued

| | 7 | 6 | 5 | 4 | 3 | 2 | 1 | 0 |
|---|---|---|---|---|---|---|---|---|
| ... | | | | Parameter Code (xx) | | | | |
| ... | DU(0) | DS(1) | TSD(0) | ETC(0) | TMC(0) | Res(0) | | LP(0) |
| ... | | | | Parameter Length (1) | | | | |
| ... | | | | xxxxxxxxxxxxxxxx | | | | |
| 99 | | | | Parameter Code (0x14) | | | | |
| 100 | | | | | | | | |
| 101 | DU(0) | DS(1) | TSD(0) | ETC(0) | TMC(0) | Res(0) | | LP(0) |
| 102 | | | | Parameter Length (1) | | | | |
| 103 | | | | Clean Now Flag | | | | |
| 104 | | | | Parameter Code (0x15) | | | | |
| 105 | | | | | | | | |
| 106 | DU(0) | DS(1) | TSD(0) | ETC(0) | TMC(0) | Res(0) | | LP(0) |
| 107 | | | | Parameter Length (1) | | | | |
| 108 | | | | Clean Periodic Flag | | | | |
| 109 | | | | Parameter Code (16) | | | | |
| 110 | | | | | | | | |
| 111 | DU(0) | DS(1) | TSD(0) | ETC(0) | TMC(0) | Res(0) | | LP(0) |
| 112 | | | | Parameter Length (1) | | | | |
| 113 | | | | Expired Cleaning Media Flag | | | | |
| ... | | | | Parameter Code (xx) | | | | |
| ... | DU(0) | DS(1) | TSD(0) | ETC(0) | TMC(0) | Res(0) | | LP(0) |
| ... | | | | Parameter Length (1) | | | | |
| 149 | | | | Parameter Code (1E) | | | | |
| 150 | | | | | | | | |
| 151 | DU(0) | DS(1) | TSD(0) | ETC(0) | TMC(0) | Res(0) | | LP(0) |
| 152 | | | | Parameter Length (1) | | | | |
| 153 | | | | Hardware A Flag | | | | |
| 154 | | | | Parameter Code (1F) | | | | |
| 155 | | | | | | | | |
| 156 | DU(0) | DS(1) | TSD(0) | ETC(0) | TMC(0) | Res(0) | | LP(0) |
| 157 | | | | Parameter Length (1) | | | | |
| 158 | | | | Hardware B Flag | | | | |
| 159 | | | | Parameter Code (20) | | | | |
| 160 | | | | | | | | |
| 161 | DU(0) | DS(1) | TSD(0) | ETC(0) | TMC(0) | Res(0) | | LP(0) |
| 162 | | | | Parameter Length (1) | | | | |
| 163 | | | | Interface Flag | | | | |
| 164 | | | | Parameter Code (21) | | | | |
| 165 | | | | | | | | |
| 166 | DU(0) | DS(1) | TSD(0) | ETC(0) | TMC(0) | Res(0) | | LP(0) |
| 167 | | | | Parameter Length (1) | | | | |
| 168 | | | | Eject Media Flag | | | | |
| 169 | | | | Parameter Code (21) | | | | |
| 170 | | | | | | | | |
| 171 | DU(0) | DS(1) | TSD(0) | ETC(0) | TMC(0) | Res(0) | | LP(0) |
| 172 | | | | Parameter Length (1) | | | | |
| 173 | | | | Download Fail Flag | | | | |
| ... | | | | Parameter Code (xx) | | | | |
| ... | DU(0) | DS(1) | TSD(0) | ETC(0) | TMC(0) | Res(0) | | LP(0) |
| ... | | | | Parameter Length (1) | | | | |
| ... | | | | xxxxxxxxxxxxxxxxxxxx | | | | |
| 199 | | | | Parameter Code (0x28) | | | | |
| 200 | | | | | | | | |
| 201 | DU(0) | DS(1) | TSD(0) | ETC(0) | TMC(0) | Res(0) | | LP(0) |
| 202 | | | | Parameter Length (1) | | | | |
| 203 | | | | Loader Hardware A Flag | | | | |
| 204 | | | | Parameter Code (0x29) | | | | |
| 205 | | | | | | | | |
| 206 | DU(0) | DS(1) | TSD(0) | ETC(0) | TMC(0) | Res(0) | | LP(0) |
| 207 | | | | Parameter Length (1) | | | | |
| 208 | | | | Stray Tape Flag | | | | |
| 209 | | | | Parameter Code (0x2A) | | | | |
| 210 | | | | | | | | |
| 211 | DU(0) | DS(1) | TSD(0) | ETC(0) | TMC(0) | Res(0) | | LP(0) |
| 212 | | | | Parameter Length (1) | | | | |
| 213 | | | | Loader Hardware B Flag | | | | |
| 214 | | | | Parameter Code (0x2A) | | | | |
| 215 | | | | | | | | |
| 216 | DU(0) | DS(1) | TSD(0) | ETC(0) | TMC(0) | Res(0) | | LP(0) |
| 217 | | | | Parameter Length (1) | | | | |
| 218 | | | | Loader Door Flag | | | | |
| ... | | | | Parameter Code (xx) | | | | |
| ... | DU(0) | DS(1) | TSD(0) | ETC(0) | TMC(0) | Res(0) | | LP(0) |
| ... | | | | Parameter Length (1) | | | | |
| ... | | | | xxxxxxxxxxxxxxx | | | | |
| 319 | | | | Parameter Code (40) | | | | |
| 320 | | | | | | | | |
| 321 | DU(0) | DS(1) | TSD(0) | ETC(0) | TMC(0) | Res(0) | | LP(0) |
| 322 | | | | Parameter Length (1) | | | | |
| 323 | | | | xxxxxxxxxxxxxxx | | | | |

TABLE 6

| | 7 | 6 | 5 | 4 | 3 | 2 | 1 | 0 |
|---|---|---|---|---|---|---|---|---|
| 0 | | | | Page Code (0x1C) | | | | |
| 1 | | | | Page Length (0x0A) | | | | |
| 2 | Perf | Reserved | | DExcpt | Test | Reserved | | LogE IT |
| 3 | | Reserved | | | | MRIE | | |
| 4 | | | | Interval Timer | | | | |
| 5 | | | | | | | | |
| 6 | | | | | | | | |
| 7 | | | | | | | | |
| 8 | | | | Report Count | | | | |
| 9 | | | | | | | | |
| 10 | | | | | | | | |
| 11 | | | | | | | | |

What is claimed is:

1. A system for storing computer data comprising:
a storage device having means for reading data from and writing data to removable media;
and a controller,
wherein the storage device comprises:
means to perform error diagnosis of interactions between the storage device and the controller and to translate low-level error indicators into a plurality of high level error conditions;
means to communicate occurrence of these high level error conditions to the controller to trigger the provision of error messages to the user;
means for communicating different high level error conditions according to how many times a specified low-level error has occurred.

2. A system according to claim 1, further comprising means for communicating different combinations of high level error conditions according to how many times a particular low-level error has occurred.

3. A system according to claim 1, wherein the low-level error indicators are grouped into functional types and wherein a predetermined sequence of high level error conditions is communicated according to how many times a low-level error of the same functional type has occurred.

4. A system comprising means for communicating different high for storing computer data comprising:

a storage device having means for reading data from and writing data to removable media; and a controller, wherein the storage device comprises:

means to perform error diagnosis of interactions between the storage device and the controller and to translate low-level error indicators into a plurality of high level error conditions;

means to communicate occurrence of these high level error conditions to the controller to trigger the provision of error messages to a user; and means for communicating different high level error conditions according to how many times a specified low-level error has occurred and according to the elapsed time since the storage device was last cleaned.

5. A system according to claim 1, wherein the error messages are categorized according to severity.

6. A system according to claim 5, wherein error messages are grouped into three categories of severity.

7. A system according to claim 1, further comprising means for automatically initiating a predetermined sequence of error recovery steps according to the high level error conditions identified.

8. A system according to claim 1, wherein error information is developed by said controller from said error indicators and error status information indicative of said error information is stored in the storage device in a standardized format.

9. A system according to claim 1, which is configured so that an occurrence of high level error conditions is communicated to the controller at predetermined points in a storage operation.

10. A system according to claim 1 which is configured so that the occurrence of high level error conditions is communicated to the controller whenever a new error is indicated by the storage device.

11. A system according to claim 1, wherein the system comprises a plurality of storage devices.

12. A system according to claim 1, wherein the storage device is a tape drive.

13. A storage device arranged for operation in a system and having means for reading data from and writing data to removable media and a controller, the storage device comprising:

means to perform error diagnosis of interactions between the storage device and the controller and to translate low-level error indicators into a plurality of high level error conditions;

means to communicate occurrence of these high level error conditions to the controller to trigger the provision of error messages to the user; and means for communicating different high level error conditions according to how many times a specified low-level error has occurred.

14. A host computer comprising controller means arranged for operation in a system that includes a storage device having means for reading data from and writing data to removable media, said host computer further comprising:

means to perform error diagnosis of interactions between the storage device and the controller and to translate low-level error indicators into a plurality of high level error conditions;

means to communicate occurrence of these high level error conditions to the controller to trigger the provision of error messages to the user;

means for communicating different high level error conditions according to how many times a specified low-level error has occurred.

15. A computer usable medium having computer readable program code means embodied in said medium executable by a host computer to perform as a controller function during the storing of computer data, said host computer including a storage device having means for reading data from and writing data to removable media, wherein the computer usable medium comprises:

means for controlling the host computer to perform error diagnosis of interactions between the storage device and said controller function and to translate low-level error indicators into a plurality of high level error conditions;

means for controlling the host computer to communicate occurrence of these high level error conditions to the controller function to trigger the provision of error messages to the user; and means for controlling the host computer to communicate different high level error conditions according to how many times a specified low-level error has occurred.

16. A method for storing computer data comprising the steps of:

reading data from and/or writing data to removable media;

performing error diagnosis on the basis of any low-level error indicators resulting from said reading and/or writing step;

translating said low-level error indicators into a plurality of high level error conditions, wherein different high level error conditions result according to how many times a specified low-level error has occurred; and triggering the provision of error messages to a user of the system on the basis of the occurrence of these high level error conditions.

* * * * *

UNITED STATES PATENT AND TRADEMARK OFFICE
CERTIFICATE OF CORRECTION

PATENT NO. : 6,263,454 B1
DATED : July 17, 2001
INVENTOR(S) : Gold et al.

It is certified that error appears in the above-identified patent and that said Letters Patent is hereby corrected as shown below:

<u>Column 24, claim 4,</u>
Lines 66 & 67, change "A system comprising means for communicating different high for storing computer data comprising:" to -- A system for storing computer data comprising: --

Signed and Sealed this

Nineteenth Day of March, 2002

Attest:

JAMES E. ROGAN
Attesting Officer    Director of the United States Patent and Trademark Office